United States Patent [19]

McKechnie et al.

[11] 4,206,633

[45] Jun. 10, 1980

[54] SURFACE PROFILE FOLLOWER AND INDICATOR SYSTEM

[75] Inventors: John C. McKechnie, Maitland; Paul D. Grimmer, Winter Park, both of Fla.

[73] Assignee: The United States of America as represented by the Secretary of the Navy, Washington, D.C.

[21] Appl. No.: 920,429

[22] Filed: Jun. 29, 1978

[51] Int. Cl.² .............................................. G01B 5/28
[52] U.S. Cl. ........................................ 73/105; 73/37.5
[58] Field of Search ................... 73/37.5, 37.6, 37.7, 73/105; 33/174 P, DIG. 2

[56] References Cited

U.S. PATENT DOCUMENTS

| 3,400,573 | 9/1968 | Matter | 73/37.5 |
|---|---|---|---|
| 3,495,442 | 2/1970 | Rysa | 73/37.6 |
| 3,519,334 | 7/1970 | Heitmann et al. | 73/37.5 X |
| 3,639,993 | 2/1972 | Sartorio | 33/174 P X |
| 3,802,086 | 4/1974 | Walker | 33/174 P X |
| 4,070,902 | 1/1978 | Knobel | 73/37.5 |

Primary Examiner—Jerry W. Myracle
Attorney, Agent, or Firm—Richard S. Sciascia; Robert W. Adams; David S. Kalmbaugh

[57] ABSTRACT

A surface profile follower and indicator system is disclosed which pneumatically senses and follows the gradients occurring in the surface of a modelboard by means of a pneumatic probe and negative feedback control sub-system which maintains said pneumatic probe at a predetermined distance from the modelboard surface being sensed at any given instant, as the entire profile follower system is moved in such manner as to effect a desired traverse thereof by any suitable carrier vehicle. A probe position pick-off is effectively connected to the aforesaid negative feedback control subsystem and supplies an analog signal to an appropriate readout which, in turn, indicates the position of said pneumatic probe with respect to a predetermined datum, thereby effectively indicating the surface irregularities of the aforesaid modelboard.

24 Claims, 1 Drawing Figure

FIG 1

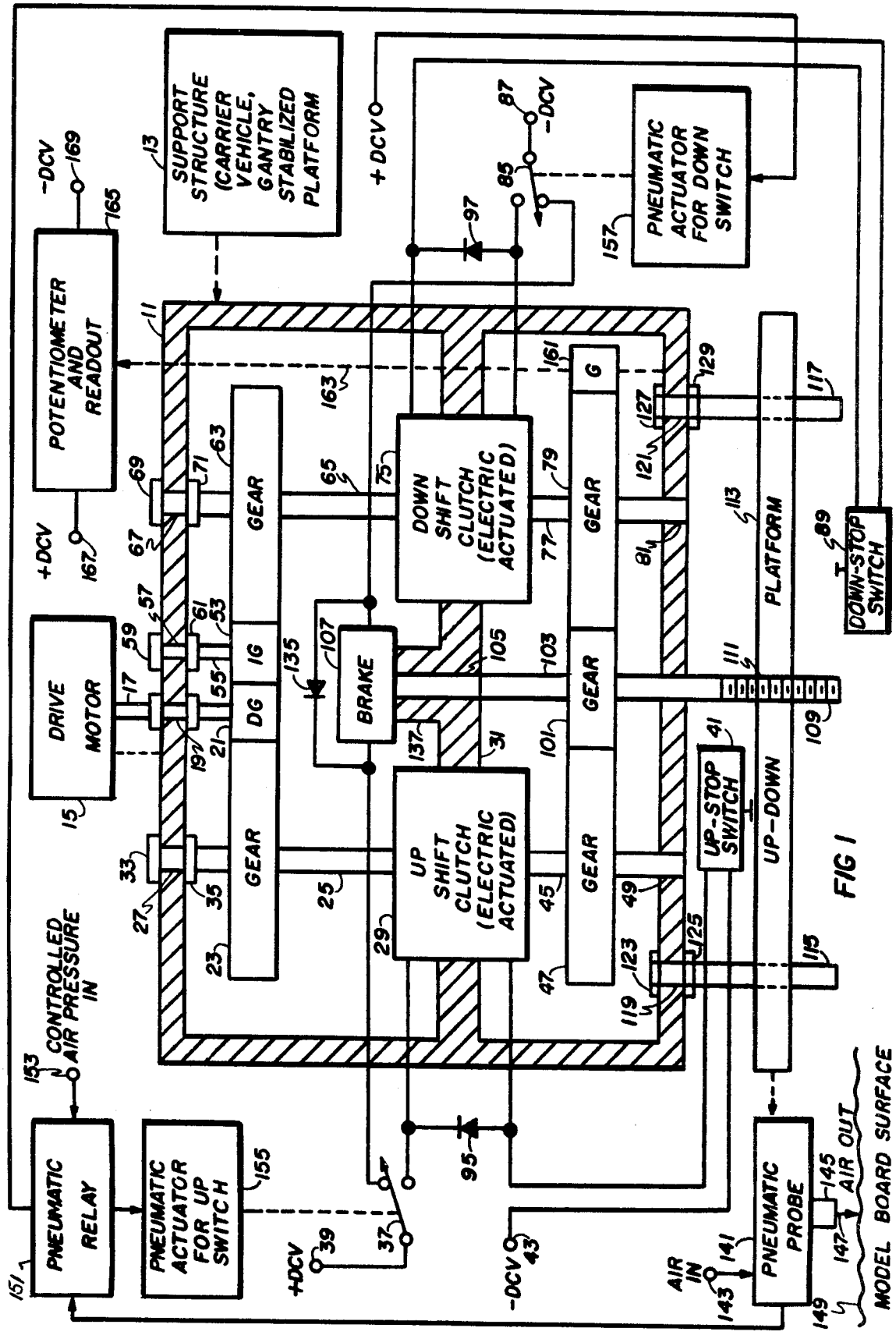

SURFACE PROFILE FOLLOWER AND INDICATOR SYSTEM

FIELD OF THE INVENTION

The present invention, in general, relates to negative feedback control systems and, in particular, pertains to an improved method and means for simultaneously sensing the contours of a non-uniform surface and indicating the gradients thereof relative to a predetermined datum. In even greater particularity, the subject invention comprises a unique system for accurately and continuously maintaining a pneumatic probe at a substantially predetermined contiguous distance from the non-uniform surface of a modelboard representing an actual earth terrain, and for simultaneously indicating the position thereof with respect to a predetermined datum, reference, location, support structure, or carrier vehicle, as desired.

DESCRIPTION OF THE PRIOR ART

Heretofore, surface roughness measurements have been made in numerous ways, including by sight, by feel, and by surveying methods. Also, various and sundry gages have been used for such purpose, some of which are quite sophisticated in structure and performance.

Insofar as it is known, the prior art coming the closest to the instant invention appears to be the following:

First, and perhaps best, are the devices disclosed in U.S. Pat. No. 3,470,739 to Hideo Takafuji et al for Apparatus for Measuring the Shape of a Sheet or Strip, issued Oct. 7, 1969. As described therein, the devices of Takafuji et al constitute apparatus for measuring the surface configuration of sheet-like members, and they have at least one sensing means movable along said sheet-like members for the purpose of sensing the gradients thereof at predetermined intervals relative to a predetermined datum. The sensing means thereof produces a signal which is a function of the aforesaid gradients, and integrating means is combined therewith for integrating said gradients signal, so as to obtain the roughness or waviness of said sheet-like member in terms of a certain mathematical expression. Because the devices of Takafuji et al appear to be primarily directed toward the measuring of surface waves or anomalies on rolled metal or strips, they ostensively work quite well for such purpose, particularly since such anomalies are relatively small and, thus, do not constitute insurmountable obstacles over which the wheels or other sensor portions thereof cannot pass. Accordingly, the devices of Takafuji appear to achieve their objectives in a quite satisfactory manner, even though it would appear that they could be severely disadvantaged if the gradients of the surface being measured vary to the extent that it produces a drag thereon.

Second, the device disclosed in patent application Ser. No. 899,194, filed Apr. 24, 1978, titled Elevation Sampling Terrain Probe, likewise constitutes prior art of significance, as far as the subject invention is concerned. Although said Elevation Sampling Terrain Probe does overcome some of the disadvantages of the above mentioned prior art, it, too, leaves something to be desired, as far as surface sampling is concerned, especially when the surface being sampled is that of a modelboard or the like which simulates actual earth terrain. Very simply, it consists of a bell crank that is driven by an electric motor, and as it is so driven, connecting rods conventionally attached thereto move multiple probes up and down and in and out of contact with the surface being measured. Such operation is accomplished at a relatively fast rate, say, for example, at a rate equal to or exceeding the natural frequency of any carrier vehicle wheels that may be moving it across said surface. Of course, said up and down movement of the aforesaid surface sampling probes prevents obstacles from interfering with the forward travel thereof, inasmuch as they timely step thereover, rather than abutting thereagainst.

As that part of the aforesaid probes intermittently makes contact with the surface being sensed and sampled, shafts respectively slide up in a frame thereof against the urging of a spring, thereby effecting the adjustment of a potentiometer in such manner as to produce a substantially square wave type output voltage that is proportional to the position thereof relative to some predetermined reference datum—say, a horizontal plane. Of course, such voltages represent the elevation of the surface being sampled at any given instant, and when a line is drawn between a succession thereof, a graphical representation of the contour of the surface being sampled is obtained.

SUMMARY OF THE INVENTION

The present invention overcomes many of the disadvantages of the aforesaid prior art, in that it automatically measures various and sundry surface gradients with considerably less drag on the surface probe or sensor caused by the friction of the particular surface involved, inasmuch as there is no actual contact therebetween. Hence, the contour measuring accuracy thereof is optimized for many practical purposes.

As previously suggested, the subject system is constructed in such manner as to run a pneumatic probe up or down, so as to hunt about a preset distance from a non-uniform surface, with said preset distance being represented by an analogous preset back pressure within said pneumatic probe. A drive motor, running at some predetermined speed, drives a left gear in the opposite direction to that of a right gear by means of an intermediate idler gear. Said left gear has a shaft connected thereto which drives an up-shift clutch, and said right gear has a shaft connected thereto which drives a down-shift clutch in the opposite direction as a result of the aforesaid intermediate idler gear being disposed therebetween. When, for example, said up-shift clutch is engaged, a shaft connected thereto is attached to another gear that drives a central gear and lead screw; and when said down-shift clutch is engaged, a shaft connected thereto drives said central gear and the lead screw connected thereto in the opposite direction, thereby causing a platform effectively connected thereto by means of screw threads to move upward and downward, respectively.

A pneumatic probe connected to said up and down moving platform builds up internal air pressure, causing a conventional but sophisticated pneumatic relay to send a pressure signal to a pneumatic switch actuator, so as to cause an up-clutch single-pole-double-throw switch to be actuated. Before actuation thereof, however, a voltage was supplied across an electromagnetic brake, causing the shaft extremity of the aforesaid lead screw to be locked. After said switch is actuated by the aforesaid switch actuator, a voltage is supplied to said up-clutch, causing the drive gear connected thereto and the lead screw gear to effect the rotation of said lead screw in such manner as to cause said platform and pneumatic probe to move away from whatever surface that is being probed thereby. Once the pneumatic probe has moved away from said surface, the pressure therein drops and reverses the aforesaid actuator up-clutch switch, thereby releasing said up-clutch and locking the aforesaid brake. Conversely, when the pneumatic probe is too far away from said surface, the air pressure therein drops, causing a pressure signal from the pneumatic relay to operate a down-switch actuator which, in turn, actuates another single-pole-double-throw switch, so as to cause the aforesaid brake to be deactivated and a down-clutch to be engaged. In such case, the drive motor drives the right gear train in opposite direction to the aforementioned idler gear, and such driving causes said lead screw to drive the aforesaid platform in the downward direction. Reverse diodes are mounted electrically across each of the electromagnetic coils of the up-clutch, the brake, and the down-clutch, respectively, so that each of the electromagnets thereof will release much faster. An up-limit switch is connected in series with the up-clutch, so that it will disengage before reaching some predetermined mechanical limit; conversely, a down-limit switch is connected in series with the aforesaid down-clutch, so that it will likewise disengage before reaching some predetermined mechanical limit.

At any given instant, the position of the aforesaid platform is sensed by another gear continuously enmeshed with the drive gear of said down-shift clutch which, in turn, is effectively connected to a potentiometer and readout that is calibrated in terms of platform position relative to some predetermined datum.

Accordingly, from the foregoing it may readily be seen that said up-down platform and the pneumatic probe connected thereto will hunt in a sensitive manner about the aforesaid datum which, of course, has been selected by the artisan to be some predetermined distance from the surface whose contours are being measured.

Therefore, an object of this invention is to provide an improved negative feedback control system.

Another object of this invention is to provide an improved surface profile follower and indicator.

Another object of this invention is to provide an improved method and means for measuring the contour gradients of any predetermined surface, including the surface of a modelboard that simulates some actual earth terrain surface.

Still another object of this invention is to provide an improved method and means for accurately positioning a movable platform relative to a predetermined datum.

A further object of this invention is to provide an improved method and means for maintaining a pneumatic sensor or probe at substantially a predetermined contiguous distance from a non-uniform surface.

Still another object of this invention is to provide an improved contour surface follower that has little or no drag with respect thereto, as it is moved therealong.

Another object of this invention is to provide an improved surface gradient measuring instrument that does not come in direct physical contact with the surface whose gradient is being measured.

Other objects, advantages and novel features of the invention will become apparent from the following detailed description of the invention when considered in conjunction with the accompanying drawing wherein:

BRIEF DESCRIPTION OF THE DRAWING

FIG. 1 is a combination schematic and block diagram of the surface profile follower and indicator constituting the subject invention.

DESCRIPTION OF THE PREFERRED EMBODIMENT

Referring now to FIG. 1, there is shown a frame 11 which is effectively supported or mounted on any preferred support structure 13 which, for example, may be any suitable controllable carrier vehicle. Of course, depending upon the surface contours being measured, said carrier vehicle may be in contact therewith as a result of rolling or sliding thereof or, in the alternative, it may be any appropriate type of gantry system which will provide relative movement between the aforesaid frame and said surface.

At this time, it would perhaps be of noteworthy significance that the subject invention has been schematically portrayed in order to keep the disclosure thereof as simple as possible. Accordingly, it should be recognized that various and sundry interconnecting structure would be required in order to make it function in an optimum manner. Obviously, it would be well within the purview of the artisan having the benefit of the teachings presented herein to design and incorporate such structure.

In this particular embodiment, a drive motor 15 is effectively mounted on said frame 11, and a drive shaft 17 connected thereto extends through a bearing hole 19 in said frame 11, with the extremity thereof connected to a drive gear 21. Said drive gear 21 directly engages a driven gear 23 which is connected to a shaft 25, the latter of which extends through a bearing hole 27 in frame 11 at one end thereof and connects to an electrically operated up-shift clutch 29, which is connected to an intermediate cross member 31 of said frame 11. If so desired, the aforesaid shaft 25 may be contained in bearing 27 by means of thrust bearings 33 and 35 attached thereto on either side of the wall of said frame 11.

Being electrically actuated, said up-shift clutch 29 is electrically connected to a normally open contact of a double-pole-single-throw switch 37, the throw of which is connected to a positive direct current voltage 39. The other electrical terminal of said up-clutch 29 is connected through an up-stop switch 41 to a negative direct current voltage 43.

The output shaft 45 of said up-shift clutch 29 is connected to a drive gear 47, with the other extremity thereof rotatably mounted within a bearing hole 49 of another of the walls of the aforesaid frame 11.

The aforesaid drive gear 21 is also engaged with an idler gear 53 which is adapted for rotation on a shaft 55 mounted in bearing hole 57 in the wall of frame 11, wherein it is rotatably secured by means of thrust bearings 59 and 61. Another driven gear 63 is engaged with said idler gear in such manner as to be driven thereby. Said driven gear 63, like the aforementioned driven gear 23, is mounted on a shaft 65 which is rotatably mounted within a bearing hole 67 located within a wall frame 11, and it is rotatably secured therein by means of any suitable end thrust bearings 69 and 71. Shaft 65 is connected to the shift input of an electrically actuated down-shift clutch 75 which is also mounted on the aforesaid intermediate cross member 31. The output shaft 77 thereof is connected to another drive gear 79, with the extremity of said shaft 77 being rotatably mounted in a suitable bearing hole 81 in the wall of the aforesaid frame 11.

Being electrically actuated, one of the electrical terminals of said down-shift clutch 75 is connected to the normally open contact of another double-pole-single-throw switch 85, the throw of which is connected to a predetermined negative direct current voltage 87. The other electrical terminal of said down-shift clutch 75 is connected through a down-stop switch 89 to a predetermined positive direct current voltage 91.

Both the aforesaid up-shift clutch and the down-shift clutch have diodes 95 and 97 electrically connected in parallel therewith, respectively.

Engaged with both of the aforesaid gears 47 and 79 is a lead screw gear 101 adapted for being driven by either one thereof, depending upon which shift clutch is engaged at any given instant, as will be more fully discussed below during the discussion of the operation of the invention. Suffice to say at this time that said gear 101 is connected to a shaft 103, one extremity of which is rotatably mounted within a bearing hole 105 and connected to an electrically actuated mechanical brake 107. The other extremity of said shaft 103 contains external screw threads 109 which mate with the internal screw threads 111 located within an up-down platform 113. In order to be movably disposed within a certain limited space-volume, said up-down platform 113 is slidably mounted upon a pair of stud bolts 115 and 117, both of which are fixedly mounted in holes 119 and 121 in one of the walls of the aforesaid frame 11 by means of nuts 123, 125, 127, and 129, respectively.

As previously indicated, the aforesaid brake 107 is electrically actuated; hence, one electrical terminal thereof is electrically connected to the normally closed contact of the aforesaid double-pole-single-throw switch 39, and the other electrical terminal thereof is connected to the normally closed contact of the aforesaid double-pole-single-throw switch 85. A diode 135 is connected in electrical parallel with said brake 107, so as to provide more positive action thereto. In order for brake 107 to have a necessary braking structure relative to the aforesaid shaft 103 which it is timely braking, it is effectively connected to the aforesaid intermediate wall 31, preferably by means of a boss 137 extending therefrom.

A suitable pneumatic probe 141 is mechanically connected to the aforesaid up-down platform in any conventional manner. Said pneumatic probe 141, likewise being conventional, is of the type that has a constant pressure air-in 143 and an air-out nozzle 145, the latter of which, of course, blows air 147 toward the surface whose contour gradients are being measured, such as, for instance, a modelboard surface 149. The pneumatic output of said probe 141 is connected to the air input of a pneumatic relay 151, which likewise, has a controlled air pressure 153 supplied thereto.

The aforesaid pneumatic relay is conventional and commerically available from several different sources. However, it has been found that the pneumatic relay named Fluidic Gaging Controller, model FGP-203, manufactured by the Johnson Service Company of Milwaukee, Wisconsin, performs quite satisfactorily as the aforementioned pneumatic relay 151, disclosed in FIG. 1. For structural and functional details thereof, reference is hereby made to the sales catalog of said Johnson Service Company. Thus, suffice to say at this time that Johnson pneumatic relay FGP-203 accepts pneumatic analog input signals in the range of from three to fifteen pounds per square inch gauge which it compares with two preset reference air pressures and then effectively ascertains whether the pressure thereof is above, below, or between said two preset reference air pressures. As a result, air is produced at either one of two outputs thereof, thereby respectively representing a too high or too low input air pressure condition; or, in the alternative, it produces no air at the outputs thereof, thereby representing the condition wherein the input air pressure falls within the pressure range between the aforesaid preset reference air pressures. Of course, the proper presetting of said reference air pressures by the artisan would depend on whatever range of air pressures would optimize the operation of the subject invention at any given time, after taking into consideration the type of surface whose gradients are being measured and the dimensions of the contour anomalies contained therein. Hence, as will be mentioned again subsequently, pneumatic relay 151 may be adjusted in such manner as to make pneumatic probe 141 hunt about a predetermined distance from the surface 149 being sensed thereby in a highly accurate and sensitive fashion, or it may be set to allow some predetermined play to occur with respect thereto. Obviously, so doing would merely involve the design choice of the artisan and/or operator.

One of the pneumatic outputs of relay 151 is connected to the input of a pneumatic actuator 155 for the up-switch double-pole-single-throw switch 37, the throw of which is effectively connected thereto for such purpose. The other pneumatic output of pneumatic relay 151 is connected to the actuation input of another switch actuator 157 for down-clutch double-pole-single-throw switch 85, the throw of which it is connected thereto for such purpose.

In the event that it is desired that the position of pneumatic probe 141 with respect to surface 149 be indicated, recorded, or otherwise read out, a suitable gear 161 may be mounted in engagement with the aforesaid down-shift clutch drive gear 79, as by any suitable shaft 163 (shown schematically) extending in a rotatable manner through suitable holes or bearings in the walls of frame 11, with one extremity thereof connected to the rotatable arm of a potentiometer 165, the fixed resistance of which is connected between a predetermined positive direct current voltage 167 and a predetermined negative direct current voltage 169. Then, as is conventional, in accordance with the disposition of the aforesaid gear 161, at any given instant, the electrical output of potentiometer 165 is effectively read out by any suitable readout which may or may not be combined therewith, as desired, but which is shown as being combined therewith in FIG. 1 for the purpose of drawing simplicity.

Mode of Operation

The operation of the invention will now be discussed briefly in conjunction with FIG. 1, the sole FIGURE of the drawing.

As carrier vehicle 13 (or any other support structure of any suitable type, such as a gantry or the like) moves the subject invention across the surface to be measured—say, the surface of modelboard 149, for the sake of convenience of discussion—air 143, at constant pressure, is supplied to pneumatic probe 141 and pneumatic relay 151. Being a conventional pneumatic probe, said air blows through a tiny passageway in nozzle 145 toward the surface of modelboard 149. Because of the smallness of the passageway of said nozzle, the air back pressure therewithin is caused to increase as probe 141 physically approaches surface 149 and decrease as it physically retracts therefrom, as is conventional with pneumatic probes and other nozzle-like sensors. Thus, is may readily be seen that the back pressure air out—or pneumatic control signal—of probe 141 is inversely proportional to the distance between said probe 141 and the aforesaid modelboard surface 149, even through the aforesaid nozzle air pressure and said pneumatic control signal are directly proportional, with the latter ordinarily being larger than the former.

Because the aforesaid air back pressure from pneumatic probe 141 is relatively small most of the time, it is used as the control air signal that is supplied to the control input of pneumatic relay 151 which, in turn, produces larger air pressure signals that are timely supplied to the switch actuators 155 and 157 for up and down clutches 29 and 75.

Although pneumatic relay 151 is conventional and commercially available, as previously indicated, the explanation of its operation will now be repeated and perhaps be supplemented in some detail because it constitutes one of the key components of the invention. Thus, again, for example, the aforesaid Johnson pneumatic relay accepts pneumatic analog input signals in the range of from 3 to 15 pounds per square inch gauge. It compares said air input signal to two reference air pressures and determines whether the input is above or below or between said two reference air pressures. The output signals therefrom consist of on and off signals of fluidic level. Therefore, by analogy, it may be considered to be the pneumatic equivalent of a single-throw-double-pole electrical switch. Hence, in this particular case, if the analog pneumatic control signal supplied thereto exceeds a certain first preset pressure, a larger, definite-pressure, pneumatic signal is produced at one of the outputs thereof, and no pneumatic signal is produced at the other output thereof; and in the event said analog pneumatic control signal supplied thereto is less than a certain second preset pressure, a larger, definite-pressure, pneumatic signal is produced at the aforesaid other output thereof, and no pneumatic signal is produced at said one output thereof. But, in the event said analog pneumatic control signal supplied to pneumatic relay 151 has a pressure that falls between the aforesaid first and second preset pressures—regardless of the range thereof—no pneumatic signal is produced at either output thereof. Although the aforementioned larger, definite-pressure, pneumatic signals are substantially constant in maximum pressure and, thus, essentially on or off in action regardless of the pressure of the aforesaid analog pneumatic signal, if so desired, the former may be made proportional to the latter, in the event so doing would optimize the operation of pneumatic relay 151 or the entire invention. In either event, the pneumatic output signals from pneumatic relay 151 timely apply air pressure to one or the other of actuators 155 and 157 which, in turn, mechanically switch the movable arm (or throw) of one or the other of electrical switches 37 and 85, so as to make it make contact with the electrical contact shown as being normally open in FIG. 1. Of course, so doing de-energizes and, thus, releases electric brake 107 and energizes either up-shift clutch 29 or down-shift clutch 75, as the case may be.

As previously mentioned, the switch which is timely actuated by switch actuator for up-clutch 155 is double-pole-single-throw switch 37; and the switch which is timely actuated by switch actuator for down-clutch is double-pole-single-throw switch 85; however, when neither switch 37 nor switch 85 is actuated because pneumatic probe 141 is traveling precisely at (or within a preset range of) the desired distance above surface 149, then neither up-clutch actuator 155 nor down-clutch actuator 157 are in an actuated state. Consequently, switches 37 and 85 are in the conditions shown in FIG. 1, respectively, and brake 107 is energized, thereby holding shaft 103 in a fixed position and gear 101 effectively in a fixed position. Obviously, when gear 101 is stationary, screw threads 109 are not turning, and up-down platform 113 and pneumatic probe 141 are stationary, too. Then, probe 141 is located at its desired preset distance (or point) above whatever surface of modelboard 149 nozzle air 147 is sensing at that particular time.

In view of the foregoing, whenever probe 141 becomes too close to surface 149 as a result of moving across a changing contour thereof, pneumatic relay 151 pressurizes actuator 155, reversing switch 37, and disengaging up-shift clutch 29. Because said up-shift clutch 29 is constantly being driven by means of motor 15 and the drive train consisting of shaft 17, gear 21, gear 23, and shaft 25, when engaged, probe 141 is raised from surface 149 by means of the drive train consisting of shaft 45, gear 47, gear 101, shaft 103, screw threads 109 and 111, and platform 113.

In the reverse situation, where pneumatic probe 141 is too far away from its preset distance from surface 149, brake 107 becomes disengaged, down-shift clutch 75 becomes engaged, and platform 113 and probe 141 are driven downward by means of the drive train consisting of motor 15, shaft 17, gear 21, idler gear 53, gear 63, shaft 65, clutch 75, shaft 77, gear 79, gear 101, shaft 103, and screw threads 109 and 111.

The upward motion of platform 113 is limited by up-stop switch 41 being contacted thereby and thus being opened at a certain up position thereof. Because the opening of up-switch 41 opens the electrical circuit to clutch 29, it becomes disengaged, thereby effectively stopping shaft 45, gear 47, gear 101, shaft 103, and the turning of screw threads 109 in platform screw threads 111. Of course, the stopping of the turning of screw threads 109 in screw threads 111 stops movement of both platform 113 and pneumatic probe 141.

Again, for purposes of emphasis, when pneumatic probe 141 is at set distance, clutches 29 and 75 are disengaged, brake 107 is energized and "on", shaft 103 is held stationary, and platform 113 and probe 141 do not move relative to either frame 11 or modelboard surface 149.

Pick-off gear 161, being constantly engaged with drive gear 79, picks off a mechanical signal that, when supplied to a properly calibrated potentiometer and readout 165, permits the latter to indicate and/or record the distance pneumatic probe 141 is from modelboard surface 149 at all times, as support structure or carrier vehicle 13 causes the rest of the invention to traverse it, or in the event modelboard 149 is moved relative thereto.

From the foregoing, it may be seen that, within a predetermined limited range, pneumatic probe 141 may be made to accurately hunt about a predetermined distance from surface 149 and, at the same time, indicate the gradients thereof without actually coming into contact therewith. And, since no physical contact is ever made between probe 141 and surface 149, little or no drag occurs therebetween. Consequently, the profile of said surface is accurately followed and indicated, even though the contour changes thereof are exceedingly small or fairly large. Accordingly, a considerable advance in surface contour measuring instrument art has been effected by this invention.

Obviously, many modifications and variations of the present invention are possible in light of the above teachings. It is, therefore, to be understood that within the scope of the appended claims the invention may be practiced otherwise than as specifically described.

What is claimed is:

1. A surface profile follower and measuring system, comprising in combination:

a pneumatic probe adapted for effectively sensing the distance therebetween and a surface whose profile is being followed and measured, said pneumatic probe having a constant pressure pneumatic input, a pneumatic nozzle output directed toward the aforesaid surface, and a pneumatic control output;

a pneumatic relay having a constant air pressure input, a pneumatic control input connected to the pneumatic control output of said pneumatic probe, and a pair of pneumatic outputs, one of which produces air at a predetermined pressure only when the air received at the aforesaid pneumatic control input is less than a first preset pressure, the other of which produces air at a predetermined pressure only when the air received at the aforesaid pneumatic control input is greater than a second preset pressure, and neither of which produces air under pressure when the pressure of the air received at the aforesaid pneumatic control input falls between said first and second preset pressures; and means connected to the pneumatic outputs of said pneumatic relay and said pneumatic probe for moving said pneumatic probe toward and away from the surface whose profile is to be followed and measured whenever the air supplied to the pneumatic control input of said pneumatic relay by said pneumatic probe is less than said first preset pressure and greater than said second preset pressure, respectively.

2. The device of claim 1, wherein said surface to be followed and measured comprises a modelboard surface.

3. The device of claim 2, wherein said surface to be followed and measured comprises a predetermined terrain surface.

4. The device of claim 1, wherein said pneumatic relay comprises a single-throw-double-pole pneumatic relay.

5. The device of claim 1, wherein said means connected to the pneumatic outputs of said pneumatic relay and said pneumatic probe for moving said pneumatic probe toward and away from the surface whose profile is to be followed and measured whenever the air supplied to the pneumatic control input of said pneumatic relay by said pneumatic probe is less than said first preset pressure and greater than said second preset pressure, respectively, comprises a negative feedback subsystem.

6. The invention of claim 1, further characterized by means effectively connected to said pneumatic probe moving means for reading out the profile of the surface being followed and measured in terms of predetermined dimensional units with respect to a predetermined reference datum.

7. The invention of claim 1, further characterized by means effectively connected to said pneumatic probe moving means for limiting the travel of said pneumatic probe in a predetermined manner toward and away from the surface whose profile is being followed and measured.

8. The invention of claim 1, further characterized by means effectively connected to said pneumatic probe moving means for braking the movement thereof whenever the air supplied to the pneumatic control input of said pneumatic relay falls between the aforesaid first and second preset pressures.

9. The invention of claim 1, further characterized by means effectively connected to said surface profile follower and measuring system for the moving thereof in such manner as to cause it to traverse a predetermined path located in contiguous disposition with the surface to be followed and measured.

10. The device of claim 9, wherein said surface profile follower and measuring system moving means comprises a carrier vehicle.

11. The device of claim 9, wherein said surface profile follower and measuring system moving means comprises a gantry.

12. The device of claim 9, wherein said surface profile follower and measuring system moving means comprises a stabilized platform.

13. The device of claim 9, wherein said surface profile follower and measuring system moving means includes a fixed support structure.

14. A surface profile follower and measuring system, comprising in combination:

a pneumatic probe adapted for effectively sensing the distance therebetween and a surface whose profile is being followed and measured, said pneumatic probe having a constant pressure pneumatic input, a pneumatic nozzle output directed toward the aforesaid surface, and a pneumatic control output;

a pneumatic relay having a constant air pressure input, a pneumatic control input connected to the pneumatic control output of said pneumatic probe, and a pair of pneumatic outputs, one of which produces air at a predetermined pressure only when the air received at the aforesaid pneumatic control input is less than a first preset pressure, the other of which produces air at a predetermined pressure only when the air received at the aforesaid penumatic control input is greater than a second preset pressure, and neither of which produces air under pressure when the pressure of the air received at the aforesaid pneumatic control input falls between said first and second preset pressures;

a negative feedback control subsystem effectively connected between the pneumatic outputs of said pneumatic relay and a mechanical input of the aforesaid pneumatic probe for moving said pneumatic probe toward and away from the surface whose profile is to be followed and measured whenever the air supplied to the pneumatic control input of said pneumatic relay by said pneumatic probe is less than said first preset pressure and greater than said second preset pressure, respectively;

a brake effectively connected to said pneumatic probe moving means for holding said pneumatic probe at substantially a certain distance from the surface whose profile is being followed and measured whenever the air supplied to the pneumatic control input of said pneumatic relay falls within the range of pressures defined by said first and second preset pressures;

a predetermined support structure effectively connected to said surface profile follower and measuring system for effecting the movement thereof across any predetermined surface whose profile is being followed and measured; and means effectively connected to said negative feedback control subsystem for continuously picking off and reading out an analog signal therefrom in terms of the position of the aforesaid pneumatic probe relative to the surface whose profile is being followed and measured.

15. The device of claim 14, wherein said brake is an electric brake, the on or off condition of which is effectively controlled by either or both of the outputs of the aforesaid pneumatic relay.

16. The device of claim 14, wherein said predetermined support structure comprises a controllable carrier vehicle.

17. The invention of claim 14, further characterized by means effectively connected to said negative feedback control subsystem for limiting the travel of said pneumatic probe in predetermined diametrically opposed directions with respect to the surface whose profile is being followed and measured.

18. The device of claim 17, wherein said pneumatic probe travel limiting means comprises:
   an electrically actuated up-stop switch; and
   an electrically actuated down-stop switch.

19. A surface profile follower and measuring system, comprising in combination:

a pneumatic probe adapted for effectively sensing the distance to a surface whose profile is being followed and measured, said pneumatic probe having a constant pressure pneumatic input, a pneumatic nozzle output directed toward the aforesaid surface, and a pneumatic control output;

pneumatic relay means having a constant air pressure input, a pneumatic control input connected to the pneumatic control output of the aforesaid pneumatic probe, and a pair of pneumatic outputs, one of which produces air at a predetermined pressure only when the air received at the pneumatic control input thereof is less than a first preset pressure, the other of which produces air at a predetermined pressure only when the air received at the pneumatic control input thereof is greater than a second preset pressure, and neither of which produces air under pressure when the pressure of the air received at the pneumatic control input thereof falls within a range of pressures defined by said first and second preset pressures;

a first pneumatic switch actuator having a pneumatic input and a mechanical output, with the pneumatic input thereof connected to one of the outputs of the aforesaid pneumatic relay;

a second pneumatic switch actuator having a pneumatic input and a mechanical output, with the pneumatic input thereof connected to the other of the pneumatic outputs of the aforesaid pneumatic relay;

a first single-pole-double-throw electrical switch, with the throw thereof mechanically connected to the mechanical output of said first pneumatic switch actuator;

a predetermined positive direct current voltage connected to the throw of said first switch;

a second single-throw-double-pole electrical switch, with the throw thereof mechanically connected to the mechanical output of said second pneumatic switch actuator;

a predetermined negative direct current voltage connected to the throw of said second electrical switch;

an electrically actuated up-shift clutch having a pair of electrical terminals, one of which is connected to the normally open contact of said first electrical switch, and the other of which is effectively connected to another predetermined positive direct current voltage;

a first diode connected across the electrical terminals of said electrically actuated up-shift clutch;

an electrically actuated down-shift clutch having a pair of electrical terminals, one of which is connected to the normally open contact of said second electrical switch, and the other of which is effectively connected to another predetermined positive direct current voltage;

a frame having a plurality of outer walls and an intermediate wall connected between a pair of opposite ones of the aforesaid outer walls, with said intermediate wall thereof having the aforesaid up-shift clutch and down-shift clutch mounted thereon;

a drive motor effectively connected to said frame;

a first gear connected to the output shaft of said drive motor;

a first shaft rotatably mounted within the aforesaid frame, with one of the extremities thereof connected to the drive input of said up-shift clutch;

a second gear mounted on said first shaft in such manner as to rotate therewith and to be in constant engagement with the aforesaid first gear;

an idler shaft rotatably mounted in one of the walls of said frame;

an idler gear connected to said idler shaft in such manner as to be in constant engagement with the aforesaid first gear;

a second shaft rotatably mounted in a wall of said frame, with one of the extremities thereof connected to the drive input of said down-shift clutch;

a third gear mounted on said second shaft in such manner as to rotate therewith and to be constantly engaged with the aforesaid idler gear;

a third shaft rotatably mounted in another of the walls of said frame, with one of the extremities thereof connected to the drive output of said up-shift clutch;

a fourth gear mounted on said third shaft for rotation therewith;

a fourth shaft rotatably mounted in one of the walls of said frame and connected to the drive output of said down-shift clutch;

a fifth gear mounted on said fourth shaft for rotation therewith;

a fifth shaft rotatably mounted between one of the outer walls of said frame and the aforesaid intermediate wall thereof, said fifth shaft having screw threads at one of the extremities thereof;

a sixth gear mounted on said third driven shaft for rotation therewith and for constant engagement with the aforesaid fourth and fifth driven gears;

a least a pair of guide studs fixedly connected to one of the outer walls of said frame and extending therefrom in the same directions and in parallel with the aforesaid threaded fifth shaft;

a platform having at least a pair of guide holes and an internally threaded hole, with the guide holes thereof being compatible with the aforesaid guide studs in such manner as to permit slidable engagement therebetween when mounted thereon, and said internal threads being such as make them complementary with the aforesaid external threads of said fifth shaft when they are screwed therein; and means for effectively connecting said platform to the aforesaid pneumatic probe for effecting the movement of said pneumatic probe therewith.

20. The device of claim 19, wherein said pneumatic relay means comprises a single-throw-double-pole pneumatic relay.

21. The invention of claim 19, further characterized by:

a sixth shaft rotatably mounted between a predetermined pair of opposite walls of said frame;

a seventh gear mounted on said sixth shaft for rotation therewith and for constant engagement with the aforesaid fifth gear;

a potentiometer having a fixed resistance connected between a positive direct current voltage and a negative direct current voltage and a movable arm in contact therewith and connected to an extremity of said sixth shaft for rotation therewith; and a readout electrically connected to the movable arm of said potentiometer.

22. The invention of claim 19, further characterized by:

a mechanically actuated, normally closed up-stop switch electrically connected between one of the terminals of the aforesaid up-shift clutch and the aforesaid negative direct current voltage, with the actuator of said up-stop switch located for being contacted by said platform at its intended upper limit; and a mechanically actuated, normally closed electrical down-stop switch connected between one of the terminals of said down-shift clutch and said another predetermined positive direct current voltage, with the actuator thereof located for being contacted by said platform at its intended lower limit.

23. The invention of claim 19, further characterized by:

an electrically actuated brake, the electrical terminals of which are connected to the normally closed electrical contact of said first single-throw-double-pole switch and the normally open electrical contact of said second single-throw-double-pole electrical switch, respectively; said brake being in such disposition with respect to the aforesaid fifth threaded shaft as to effect the braking thereof when energized and the release thereof when de-energized; and a diode connected in electrical parallel with said brake.

24. The invention of claim 19, further characterized by means effectively connected to said surface profile follower and measuring system for the moving thereof in such manner as to effect the traverse thereof along a predetermined path adjacent to the surface to be followed and measured.

* * * * *